US010393938B2

(12) United States Patent
Jang et al.

(10) Patent No.: US 10,393,938 B2
(45) Date of Patent: Aug. 27, 2019

(54) DISPLAY APPARATUS

(71) Applicant: SAMSUNG ELECTRONICS CO., LTD., Suwon-si, Gyeonggi-do (KR)

(72) Inventors: Nae Won Jang, Seongnam-si (KR); Kye Hoon Lee, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 116 days.

(21) Appl. No.: 15/501,001

(22) PCT Filed: Apr. 9, 2015

(86) PCT No.: PCT/KR2015/003559

§ 371 (c)(1),
(2) Date: Feb. 1, 2017

(87) PCT Pub. No.: WO2016/017899

PCT Pub. Date: Feb. 4, 2016

(65) Prior Publication Data

US 2017/0219758 A1 Aug. 3, 2017

(30) Foreign Application Priority Data

Aug. 1, 2014 (KR) ........................ 10-2014-0098977

(51) Int. Cl.
*F21V 7/04* (2006.01)
*F21V 8/00* (2006.01)
*G02F 1/1335* (2006.01)

(52) U.S. Cl.
CPC ......... *G02B 6/0023* (2013.01); *G02B 6/0028* (2013.01); *G02B 6/0031* (2013.01); *G02B 6/0085* (2013.01); *G02F 2001/133614* (2013.01)

(58) Field of Classification Search
CPC .. G02B 6/0035; G02B 6/0023; G02B 6/0028; G02B 6/0031; G02B 6/0085
(Continued)

(56) References Cited

U.S. PATENT DOCUMENTS

2006/0001037 A1* 1/2006 Schardt ................ G02B 6/0008 257/98
2012/0113671 A1 5/2012 Sadasivan et al.
(Continued)

FOREIGN PATENT DOCUMENTS

EP 2 719 943 4/2014
KR 10-2013-0022714 3/2013
(Continued)

OTHER PUBLICATIONS

Extended European Search Report dated Nov. 7, 2017 for counterpart EP Application No. 15827540.4.
(Continued)

*Primary Examiner* — Matthew J. Peerce
(74) *Attorney, Agent, or Firm* — Nixon & Vanderhye, P.C.

(57) ABSTRACT

According to a display apparatus according to an embodiment of the present invention, it is possible to prevent a quantum dot unit provided in a backlight assembly from being damaged by heat generated from a light source. The display apparatus according to an embodiment of the present invention includes a display panel that displays an image, a light source that provides light from a rear side of the display panel, a light guide plate that is positioned on the rear side of the display panel and guides light emitted from the light source, and a quantum dot unit that is provided to be spaced apart from the light source and converts a wavelength of the light emitted from the light source.

10 Claims, 5 Drawing Sheets

(58) Field of Classification Search
USPC .......................................................... 362/609
See application file for complete search history.

(56) References Cited

U.S. PATENT DOCUMENTS

| | | | | |
|---|---|---|---|---|
| 2012/0113672 | A1 | 5/2012 | Dubrow et al. | |
| 2013/0258709 | A1 | 10/2013 | Thompson et al. | |
| 2014/0334181 | A1* | 11/2014 | Hu | G02B 6/0023 362/608 |
| 2015/0212260 | A1* | 7/2015 | Li | G02B 6/0086 362/608 |

FOREIGN PATENT DOCUMENTS

| | | |
|---|---|---|
| KR | 10-2013-0024018 | 3/2013 |
| WO | 2014/006501 | 1/2014 |

OTHER PUBLICATIONS

International Search Report for PCT/KR2015/003559 dated Jun. 30, 2015, 3 pages.
Written Opinion of the ISA for PCT/KR2015/003559 dated Jun. 30, 2015, 7 pages.

* cited by examiner

[Fig. 1]
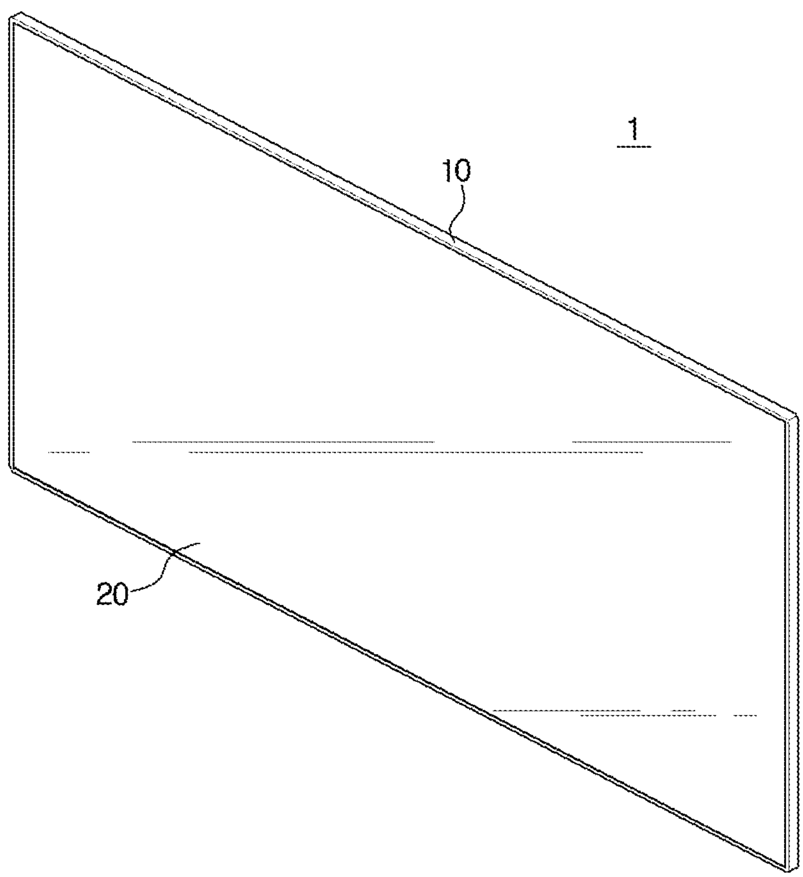

[Fig. 2]
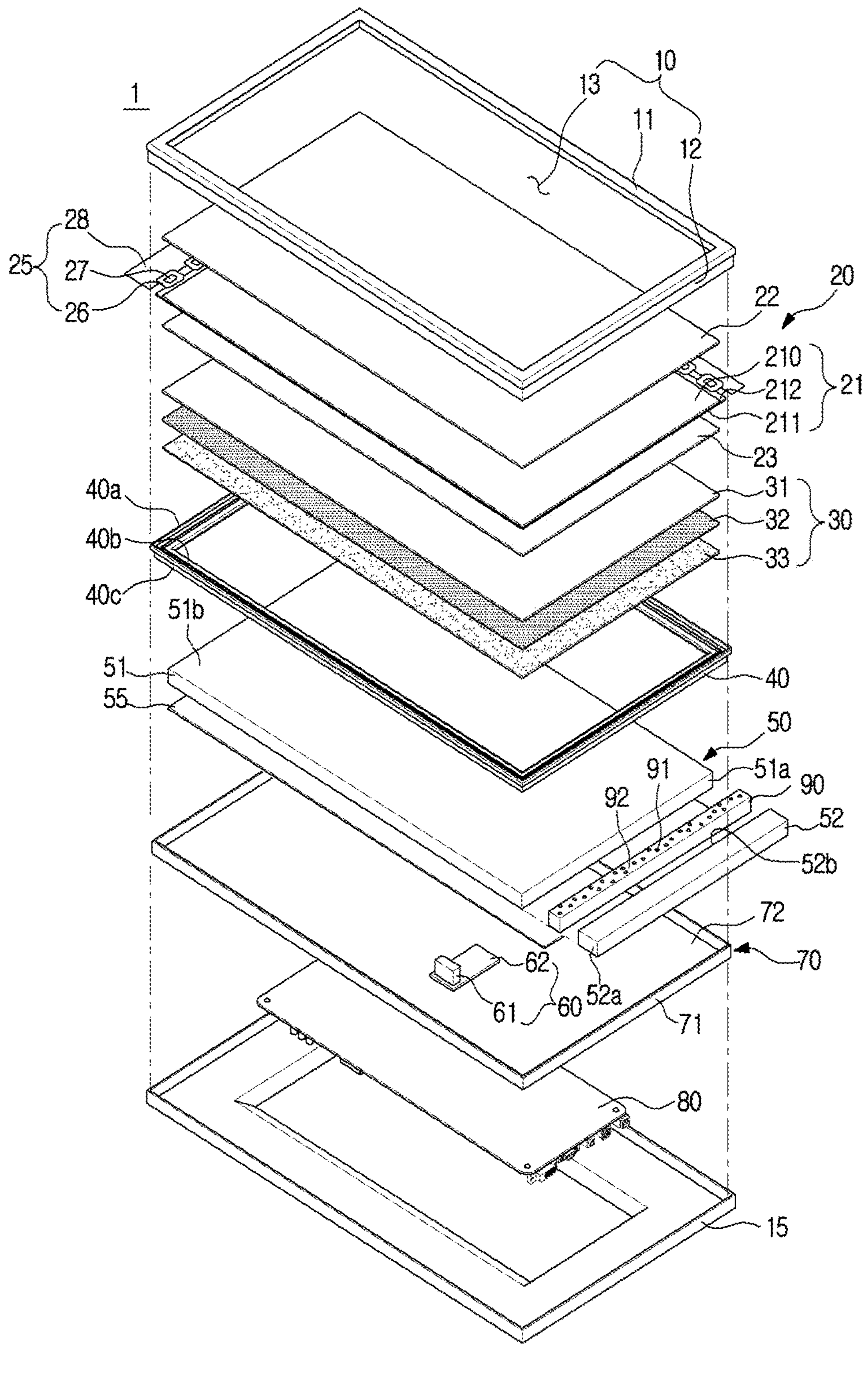

[Fig. 3]
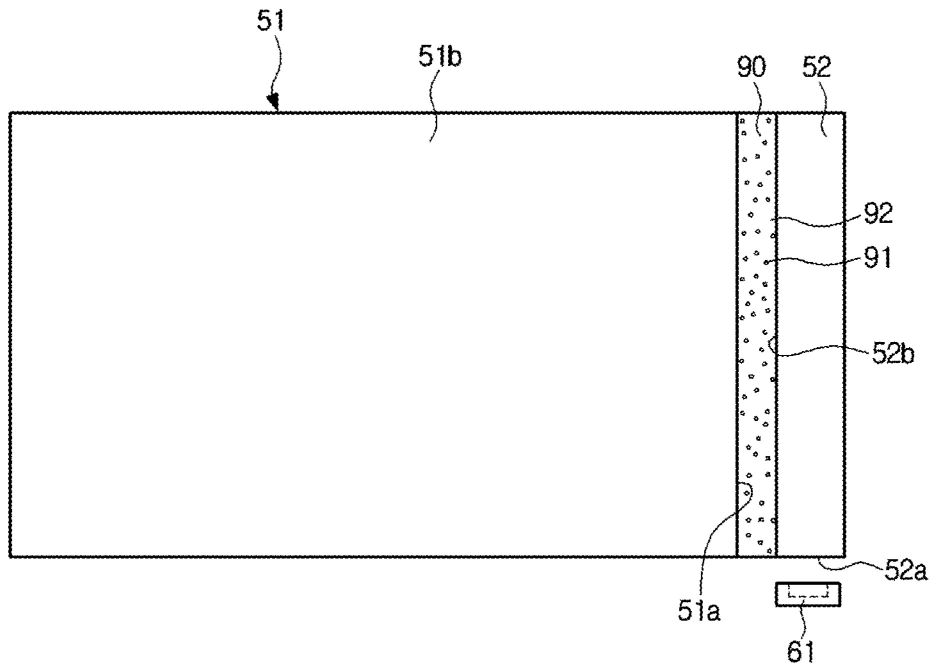
[Fig. 4]
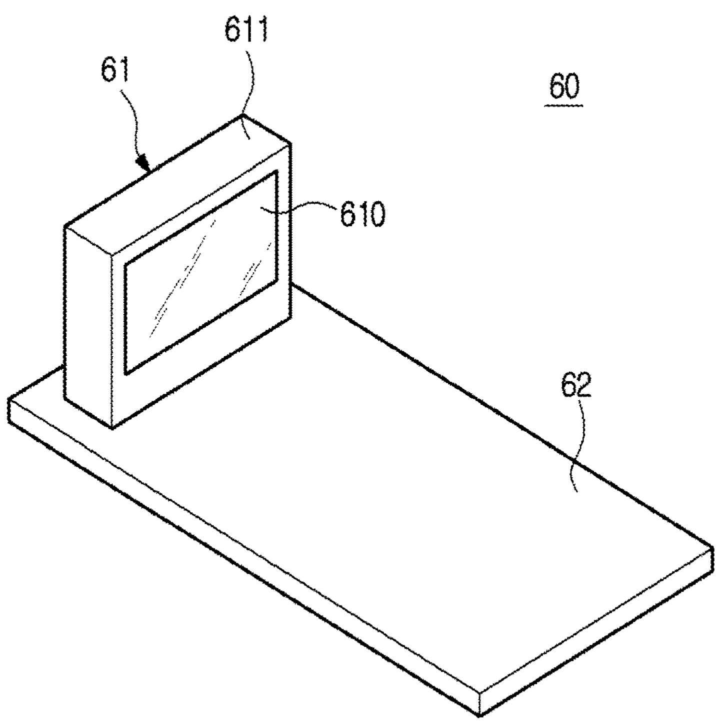

[Fig. 5]
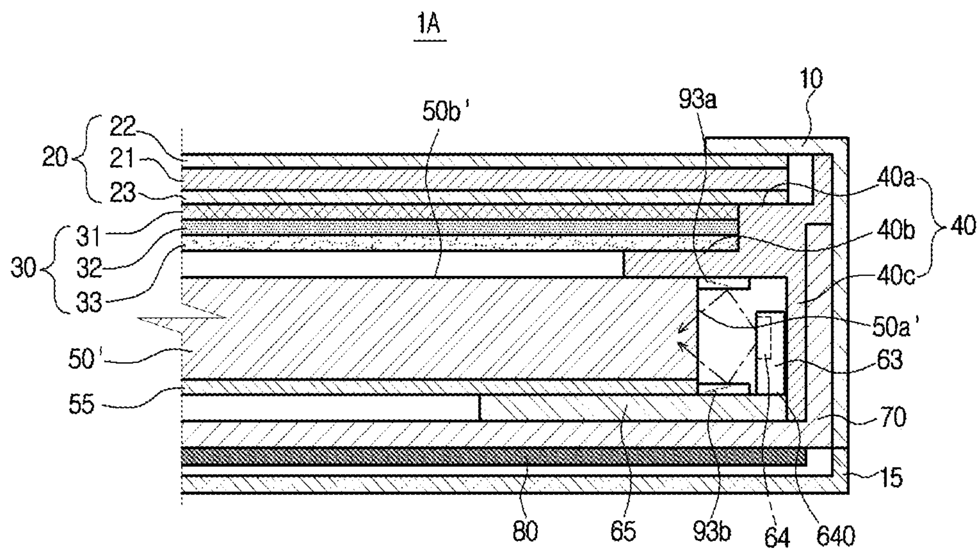
[Fig. 6]
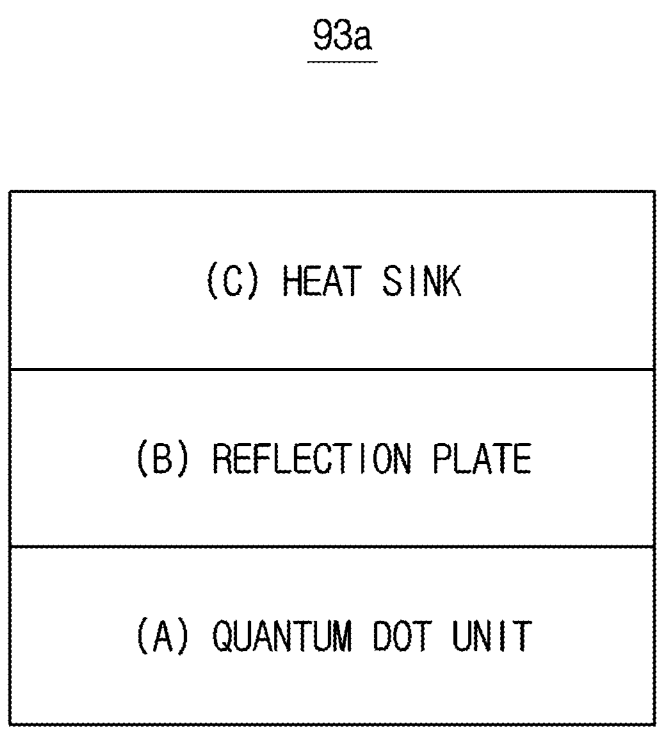

[Fig. 7]
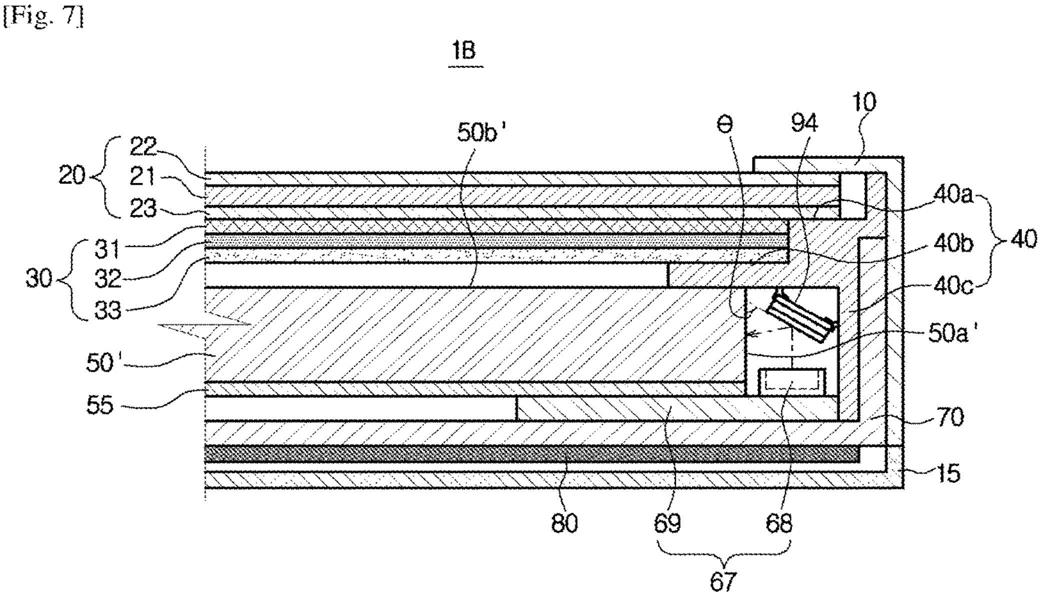

DISPLAY APPARATUS

This application is the U.S. national phase of International Application No. PCT/KR2015/003559 filed Apr. 9, 2015 which designated the U.S. and claims priority to KR Patent Application No. 10-2014-0098977 filed Aug. 1, 2014, the entire contents of each of which are hereby incorporated by reference.

TECHNICAL FIELD

The present invention relates to a display apparatus that improves color reproducibility.

BACKGROUND ART

A display apparatus refers to an apparatus that visually displays data information such as characters, shapes, and the like. The display apparatus includes a liquid crystal display apparatus and a frame in which the liquid crystal display apparatus is mounted.

The liquid crystal display apparatus is a passive optical device that does not emit light by itself, and thereby display an image using a backlight assembly attached to a rear surface of a display panel. A size, optical efficiency, and the like of the liquid crystal display apparatus may be changed according to the structure of the backlight assembly to thereby greatly affect the overall mechanical and optical characteristics of the liquid crystal display apparatus.

The backlight assembly may be divided into a direct type backlight assembly and an edge type backlight assembly according to positions of light sources. The direct type backlight assembly has a light source disposed on the bottom of a liquid crystal panel so that the light source directly emits light to the front surface of the liquid crystal panel. The edge type backlight assembly includes a light source disposed behind a liquid crystal panel.

In recent years, an attempt to dispose a quantum dot unit on one side of the backlight assembly to improve color reproducibility of a display apparatus has been made. Quantum dots are semiconductor crystals of nanometer (nm) sizes that are created through a chemical synthesis process, and are materials that emit light having a shorter wavelength as a size of the particle of the quantum dots is smaller and emit light having a longer wavelength as the size of the particle is larger.

When the quantum dot unit is provided in front of the backlight assembly, light of a desired wavelength in a visible ray region may be emitted by adjusting a particle size of the quantum dots. Light having a wavelength converted by the quantum dot unit can be made incident on a light guide plate or a display panel. Through the backlight assembly using such quantum dots, a display apparatus having excellent color reproducibility can be implemented with less production costs.

DISCLOSURE

Technical Problem

The present invention is directed to providing a display apparatus using a quantum dot unit which may achieve high-quality color reproducibility with less production costs, but may be vulnerable to a high temperature, moisture, and the like.

Technical Solution

One aspect of the present invention provides a display apparatus including: a display panel that displays an image; a light source that provides light from a rear side of the display panel; a light guide plate that is positioned on the rear side of the display panel and guides light emitted from the light source; and a quantum dot unit that is provided to be spaced apart from the light source and converts a wavelength of the light emitted from the light source.

A wavelength of at least a part of the light emitted from the light source may be converted by the quantum dot unit, and transmitted to the light guide plate.

A reflection layer may be provided on one side of the quantum dot unit to reflect light passing through the quantum dot unit toward the light guide plate.

A heat sink may be further provided in the quantum dot unit.

The heat sink may be provided on one surface of the reflection layer.

The light source may be singly provided on one side of the light guide plate.

The light source may be a laser light source.

The light guide plate may include a main light guide plate positioned on the rear side of the display panel and a sub light guide plate connected to a side of the main light guide plate.

The quantum dot unit may be positioned between the main light guide plate and the sub light guide plate.

The light source may be positioned on one side of the sub light guide plate.

Light that passes through the quantum dot unit and then is made incident on the light guide plate and light that is made incident on the light guide plate from the light source may be mixed to form white light.

The light source may be a light source that emits blue light.

The two quantum dot units may be arranged to face each other in a front and back direction between the light source and the light guide plate.

One surface of the quantum dot unit may be disposed to form an acute angle with one surface of the light guide plate.

A middle mold may be provided between the display panel and the light source, and the quantum dot unit may be mounted on an inner wall of the middle mold.

Another aspect of the present invention provides a display apparatus including: a display panel that displays an image; a light source that is positioned behind the display panel; a quantum dot assembly that converts a wavelength of light made incident from the light source; and a light guide plate that guides light emitted from the light source and light passing through the quantum dot assembly, wherein the quantum dot assembly includes a quantum dot unit that converts the wavelength of light made incident, a reflection layer that is provided on one surface of the quantum dot unit, and a heat sink that is provided on one surface of the reflection layer.

The quantum dot assembly may be disposed in such a manner that the quantum dot unit faces the light source.

The quantum dot assembly may be positioned between one surface of the light guide plate and the light source.

The quantum dot assembly may be disposed in such a manner that the one surface of the quantum dot unit forms an acute angle with an incident surface of the light guide plate.

A plurality of quantum dot assemblies may be provided, and disposed in a front and back direction in such a manner that one surfaces of the quantum dot units face each other.

Still another aspect of the present invention provides a display apparatus including: a display panel that displays an image; a main light guide plate that is positioned behind the display panel; a quantum dot unit that is connected to one side of the main light guide plate; a sub light guide plate that is connected to the quantum dot unit; and a light source that is provided on one side of the sub light guide plate and supplies light to the sub light guide plate, wherein a wavelength of the light supplied to the sub light guide plate is converted by the quantum dot unit and supplied to the main light guide plate.

The light source may be singly provided to be spaced apart from the quantum dot unit.

The light source may be a laser light source.

Advantageous Effects

According to a display apparatus according to an embodiment of the present invention, a quantum dot unit may be provided to improve color reproducibility. In addition, the quantum dot unit and a light source may be positioned so as to be spaced apart from each other as much as possible, so that it is possible to prevent the quantum dot unit from being damaged by heat generated from the light source.

DESCRIPTION OF DRAWINGS

FIG. 1 is a perspective view showing a display apparatus according to an embodiment of the present invention;

FIG. 2 is an exploded perspective view showing a display apparatus according to an embodiment of the present invention;

FIG. 3 is a schematic view showing a state in which a part of a display apparatus according to an embodiment of the present invention is viewed from a front side;

FIG. 4 is a schematic view showing a light source provided in a display apparatus according to an embodiment of the present invention;

FIG. 5 is a cross-sectional view showing a part of a display apparatus according to another embodiment of the present invention;

FIG. 6 is a schematic view showing a quantum dot assembly provided in a display apparatus according to another embodiment of the present invention; and FIG. 7 is a cross-sectional view showing a part of a display apparatus according to still another embodiment of the present invention.

MODES OF THE INVENTION

Hereinafter, a display apparatus according to an embodiment of the present invention will be described in detail with reference to the accompanying drawings.

FIG. 1 is a perspective view showing a display apparatus according to an embodiment of the present invention, and FIG. 2 is an exploded perspective view showing a display apparatus according to an embodiment of the present invention.

Referring to FIGS. 1 and 2, a display apparatus 1 according to an embodiment of the present invention includes a top chassis 10, a display panel 20, a backlight unit 60, and a bottom chassis 70. The top chassis 10 is disposed in front of the display panel 20. The backlight unit 60 is disposed behind the display panel 20 so as to be spaced apart from the display panel 20. The bottom chassis 70 may be disposed behind the display panel 20 and the backlight unit 60.

A middle mold 40 may be further provided between the display panel 20 and the backlight unit 60. The middle mold 40 may allow the display panel 20 to be supported by the backlight unit 60 while being spaced apart from the backlight unit 60. A printed circuit board assembly 80 capable of controlling driving of the display apparatus 1 may be positioned behind the bottom chassis 70. A rear cover 15 capable of forming a rear appearance of the display apparatus 1 may be provided behind the printed circuit board assembly 80.

A plurality of optical sheets 30 may be provided behind the display panel 20. A light guide plate 50 may be positioned behind the optical sheets 30. A reflection sheet 55 may be disposed behind the light guide plate 50.

The optical sheets 30 include a protection film 31, a prism film 32, and a diffusion film 33. The protection film 31 is disposed in front of the prism film 32 to protect the prism film 32 which is sensitive to scratch due to dust or the like.

A triangular pillar-shaped prism may be disposed on a front surface of the prism film 32. By the prism film 32, light diffused by the diffusion film 33 may be converged in a direction perpendicular to a rear surface of the display panel 20 on the front side. Two sheets of prism films 32 may be used. Light passing through the prism film 32 advances perpendicular to the display panel 20 so that the display panel 20 may have uniform brightness.

A coating layer containing beads may be formed on the diffusion film 33. Light passing through the light guide plate 50 by the diffusion film 33 may be guided to be supplied to the display panel 20.

The light guide plate 50 may allow light emitted from a light source 61 to be uniformly supplied to the diffusion film 33. The light guide plate 50 may be made of acrylic resin such as polymethyl methacrylate (PMMA) or polymethylstyrene.

The light guide plate 50 may include a main light guide plate 51 and a sub light guide plate 52. The main light guide plate 51 may be positioned behind the display panel 20. The sub light guide plate 52 may be provided on one side of the main light guide plate 51.

A quantum dot unit 90 may be positioned between the main light guide plate 51 and the sub light guide plate 52. A wavelength of light emitted from the backlight unit 60 may be converted by the quantum dot unit 90. A detailed structure of the quantum dot unit 90 will be described later.

The main light guide plate 51 and the sub light guide plate 52 may respectively include incident surfaces 51*a* and 52*a* and emission surfaces 51*b* and 52*b*. The light emitted from the backlight unit 60 may be made incident through the incident surface 52*a* of the sub light guide plate 52 and emitted toward the quantum dot unit 90 through the emission surface 52*b*, and light whose wavelength is converted while passing through the quantum dot unit 90 may be made incident through the incident surface 51*a* of the main light guide plate 51 and emitted through the emission surface 51*b*.

The incident surface 51*a* of the main light guide plate 51 may face one surface of the quantum dot unit 90, and the emission surface 51*b* may be positioned behind the diffusion film 33 to face one surface of the diffusion film 33. The incident surface 52*a* of the sub light guide plate 52 may face the light source 61 provided in the backlight unit 60, and the emission surface 52*b* may face the other surface of the quantum dot unit 90.

The backlight unit 60 may include the light source 61 and a printed circuit board 62. The light source 61 may protrude to a front side of the reflection sheet 55 which will be described later, and the printed circuit board 62 may be positioned on a rear surface of the reflection sheet 55.

The backlight unit 60 may be positioned on one side of the sub light guide plate 52. The light source 61 may face the incident surface 52*a* of the sub light guide plate 52. The light source may be singly provided. In this instance, the light source 61 may be a laser light source that emits blue light or a high power light source.

The reflection sheet 55 may be disposed behind the light guide plate 50. Light emitted through a lower surface of the light guide plate 50 may be guided to the light guide plate 50 again by the reflection sheet 55. The reflection sheet 55 may be made of a plastic material such as polyethylene terephthalate (PET) or polycarbonate (PC).

The display panel 20 may include a first substrate 211 that includes a thin film transistor (TFT) and a pixel electrode provided therein and a second substrate 210 that is positioned on one side of the first substrate 211 and includes a color filter and a driving source provided therein. A liquid crystal layer 212 may be provided between the first substrate 211 and the second substrate 210. Polarization sheets 22 and 23 may be attached to a lower surface of the first substrate 211 or an upper surface of the second substrate 210. A module in which the first substrate 211, the second substrate 210, and the liquid crystal layer 212 are combined may be referred to as a liquid crystal display module 21.

A driving unit 25 for applying a driving signal may be provided on one side of the first substrate 211. The driving unit 25 may include a flexible printed circuit board 26, a driving chip 27, and a circuit board 28. The driving chip 27 may be mounted to one side of the flexible printed circuit board 26. The circuit board 28 may be connected to the other side of the flexible printed circuit board 26.

The flexible printed circuit board 26 may be provided in a chip on film (COF) method in which a chip device is mounted on a base film. The flexible printed circuit board 26 may be provided in the form of a tape carrier package (TCP) using a tape automated bonding (TAB) technique or chip on glass (COG).

Black matrices may be formed in the second substrate 210, and a color filter (not shown) may be formed between the black matrices. As an example, the black matrices may be made of organic matter containing chrome oxide or black pigment. The color filter may be formed regularly, and obtained by repeating three sub layers (not shown) having mutually different colors.

The display panel 20 may form a screen by adjusting arrangement of the liquid crystal layer 212. The display panel 20 may be a non-light emitting element, and display an image by receiving light from the backlight unit 60.

The top chassis 10 may include a bezel 11 and a top side surface 12. The bezel 11 may wrap a front edge of the display panel 20. The top side surface 12 may be provided to be bent backward from an end of the bezel 11. At least a part of the top side surface 12 may be brought into contact with the bottom chassis 70. As an example, the at least a part of the top side surface 12 may cover an outer surface of a bottom side surface 71.

An opening 13 may be formed in the top chassis 10 so that display panel 20 may be exposed. Through the opening 13, an effective display area in which a screen is actually displayed in the display panel 20 may be exposed to the front surface.

The bottom chassis 70 may include the bottom side surface 71 and a bottom surface 72. The bottom side surface 71 may protrude to the front side along a periphery of the bottom surface 72 to be extended. The backlight unit 60 may be seated on the bottom surface 72. A radiation sheet (not shown) may be provided on the bottom surface 72.

The middle mold 40 may include a first support portion 40*a*, a second support portion 40*b*, and an extension portion 40*c*. The first support portion 40*a* and the second support portion 40*b* may be formed in such a manner as to be extended to an inner side of the middle mold 40. The second support portion 40*b* may be extended to the inner side from the first support portion 40*a*, and extended to be stepped rearward from the first support portion 40*a*. The extension portion 40*c* is extended to a rear side of the middle mold 40. A part of the display panel 20 may be supported by the first support portion 40*a*. A part of the optical sheet 30 may be supported by the second support portion 40*b*. An outer surface of the extension portion 40*c* may be brought into contact with an inner surface of the bottom chassis 70.

The printed circuit board assembly 80 may be mounted to a rear side of the bottom chassis 70. The rear cover 15 may be positioned on a rear side of the printed circuit board assembly 80. The printed circuit board assembly 80 may include a printed circuit board and a plurality of electronic components mounted in the printed circuit board. The electronic components may be mounted to a front surface or a rear surface of the printed circuit board. The plurality of electronic components may be mounted in the printed circuit board or fixed by a clamp.

FIG. 3 is a schematic view showing a state in which a part of a display apparatus according to an embodiment of the present invention is viewed from a front side, and FIG. 4 is a schematic view showing a light source provided in a display apparatus according to an embodiment of the present invention.

Referring to FIGS. 3 and 4, the backlight unit 60 of the display apparatus 1 according to an embodiment of the present invention may include a single light source 61. The light source 61 may be provided on one side of the display apparatus 1. A wavelength of light emitted from the light source 61 may be converted while the light emitted from the light source 61 is passing through the quantum dot unit 90, and made incident on the sub light guide plate 52.

The light source 61 may be provided in the form in which a light source body 610 that emits light in one direction is received within a case 611 as shown in FIG. 4. An opening may be provided on one surface of the case 611, and the light source body 610 received within the case 611 may be exposed through the opening.

The light source 61 may be positioned on one side of the sub light guide plate 52. Specifically, the light source 61 may be positioned to face the incident surface 52*a* of the sub light guide plate 52. When the display apparatus 1 is viewed from the front side, the light source 61 may be provided to be adjacent to one edge of the display apparatus 1.

The light emitted from the light source 61 may be made incident on the incident surface 52*a* of the sub light guide plate 52, and light emitted through the emission surface 52*b* of the sub light guide plate 52 may be made incident on the quantum dot unit 90. The light made incident on the quantum dot unit 90 may be made incident on the incident surface 51*a* of the main light guide plate 51 while a wavelength of the light made incident on the quantum dot unit 90 is converted. White light made incident on the main light guide plate 51 may be diffused and emitted in the whole of the emission surface 51*b* of the main light guide plate 51, and made incident toward the display panel 20 positioned in front of the main light guide plate 51.

The light source 61 may be a laser light source or other high power light sources. Conventionally, a plurality of light sources are provided on one rear side of the display apparatus, but in the present invention, the number of the light sources may be minimized in order to minimize a deterioration phenomenon of the quantum dot unit 90 by the light source, and a laser light source or other high power light sources may be provided in order to secure the intensity of light supplied by the plurality of light sources.

The light source 61 may be positioned on a side of the sub light guide plate 52 to be spaced apart from the quantum dot unit 90 by a predetermined distance, and therefore it is possible to prevent the quantum dot unit 90 from being deteriorated by heat emitted from the light source 61.

In a case of a conventional backlight unit, a plurality of light sources (light emitting diodes (LEDs)) may be mounted on a printed circuit board. The light source may be a plurality of light sources which emit white light or a combination of a plurality of light sources which emit red, green, or blue light.

The red, green, or blue light may be emitted according to a wavelength of the light emitted from the light source. The wavelength of the light emitted from the light source may be changed depending on the type of impurity added to a semiconductor provided in the light source. A phosphor may be provided on an outer peripheral surface of a light-emitting chip, and light of a variety of wavelength ranges may be emitted according to the phosphor that wraps the outer peripheral surface of the chip.

For example, the light source may be provided in such a manner that a red, a green, or a blue phosphor wraps the outer peripheral surface of a blue chip that emits blue light. When the red phosphor wraps the outer peripheral surface of the blue chip, magenta light may be emitted, when the green phosphor wraps the outer peripheral surface of the blue chip, cyan light may be emitted, and when the red phosphor and the green phosphor wrap the outer peripheral surface of the blue chip, white light may be emitted.

In recent years, a technique of variously implementing a wavelength of light emitted from the light source of the backlight unit using the quantum dot unit rather than the phosphor has been developed and used. The quantum dot unit may be positioned between a blue light source element and a light guide plate to thereby implement high color reproducibility of a level of an OLED.

The quantum dot unit 90 may include a plurality of quantum dot particles 91 and a host layer 92. The quantum dot particles 91 may be uniformly dispersed within the host layer 92. The host layer 92 may be constituted of a transparent polymer. The quantum dot particles 91 may convert a wavelength of light emitted from the backlight unit 60. For example, the quantum dot particles 91 may convert a part of blue light emitted from the backlight unit 60 into green light having a wavelength range between about 520 nm to 560 nm, and convert another part of the blue light emitted from the backlight unit 60 into red light having a wavelength range between about 630 nm to 660 nm.

A fluorescent wavelength may be changed according to the size of the quantum dot particles 91. That is, light having a shorter wavelength may be emitted as the size of the particles is smaller, and light having a longer wavelength may be emitted as the size of the particles is larger. By appropriately adjusting the size of the quantum dot particles 91 provided in the quantum dot unit 90, the light emitted from the light source may be converted into red, green, or blue light. The red, green, and blue light converted by the quantum dot unit 90 may be combined to form white light. The white light formed by the quantum dot unit 90 may be made incident on the light guide plate.

The quantum dot unit may be provided in the form of a sheet to be positioned in front of the light guide plate, or provided in the form of a bar to be positioned in front of the light source. The quantum dot unit may be vulnerable to a high-temperature environment, and therefore a problem that the quantum dot unit is deteriorated by heat of a high temperature generated from the light source may occur. In a conventional display apparatus, the quantum dot unit is positioned adjacent to the light source, and thereby is deteriorated by the heat generated from the light source, which may affect the quality of an image displayed in the display apparatus.

In the present invention, the quantum dot unit 90 is positioned to be spaced apart from the light source 61 as much as possible within the display apparatus 1, and thereby it is possible to prevent a phenomenon that the quantum dot unit 90 is deteriorated by the heat generated from the light source 61.

In the display apparatus 1 according to an embodiment of the present invention, the light source 61 is provided on one side of the sub light guide plate 52, so that the light emitted from the light source 61 may not be directly made incident on the quantum dot unit 90 and light passing through the sub light guide plate 52 may be made incident on the quantum dot unit 90.

In this manner, the quantum dot unit 90 and the light source 61 may be provided to be spaced apart from each other without facing each other, and thereby it is possible to prevent the heat generated from the light source 61 from being directly transmitted to the quantum dot unit 90. Thus, it is possible to prevent the quantum dot unit 90 from being deteriorated by the heat of the high-temperature generated from the light source 61. In addition, by minimizing the number of the light sources 61, a heat generating amount of the light source 61 that can be transmitted to the quantum dot unit 90 may be reduced, and therefore it is possible to prevent the heat of high-temperature from being transmitted to the quantum dot unit 90.

The light source 61 may be provided as a laser light source or other high power light sources, and therefore light may be sufficiently supplied to the display panel 20 even using a minimum number of light sources 61. As described above, an example in which the light source 61 is singly provided has been described, but the number of the light sources 61 is not limited to the disclosed embodiments. That is, at least one light source 61 may be provided so that sufficient light can be supplied to the display panel 20 according to the size of the display apparatus 1.

FIG. 5 is a cross-sectional view showing a part of a display apparatus according to another embodiment of the present invention.

Referring to FIG. 5, in a display apparatus 1A according to another embodiment of the present invention, other components excluding a backlight unit 63, a light guide plate 50', and quantum dot assemblies 93*a* and 93*b* may be applied in a similar manner to that in the display apparatus 1 according to an embodiment of the present invention. In the light guide plate 50' provided in the display apparatus 1A according to another embodiment of the present invention, a main light guide plate and a sub light guide plate may not be separately provided. Hereinafter, the backlight unit 63, the light guide plate 50', and the quantum dot assemblies 93*a* and 93*b* will be described.

In the display apparatus 1A according to another embodiment of the present invention, the backlight unit 63 may be provided on a side of the light guide plate 50', and the quantum dot assemblies 93*a* and 93*b* may be provided between the light guide plate 50' and the backlight unit 63.

The backlight unit 63 may include a light source 64 and a printed circuit board 65. The light source 64 may supply light to the light guide plate 50'. A plurality of light sources 64 may be provided on a side of the display apparatus 1. The plurality of light sources 64 may be received within a case 640 with an opening formed thereon, and the plurality of light sources 64 which are exposed through the opening may be positioned to face the light guide plate 50'.

The light source 64 may be a light source that emits blue light such as the light source 61 provided in the display apparatus 1 according to an embodiment of the present invention. The light source 64 may be a laser light source, other high power light sources, or a light-emitting diode.

The quantum dot assemblies 93*a* and 93*b* may be arranged to face each other in a front and back direction between the light guide plate 50' and the backlight unit 63. A wavelength of light that is emitted from the backlight unit 63 and is made incident on the quantum dot assemblies 93*a* and 93*b* may be converted. The light having the converted wavelength may be reflected, and the reflected light may be made incident on an incident surface 50*a*' of the light guide plate 50'. The light that is made incident on the light guide plate 50' may be guided, and emitted through an emission surface 50*b*' to be supplied to the display panel 20 positioned in the front side.

A part of the light emitted from the backlight unit 63 may be directly made incident on the light guide plate 50', and the remaining part of the light may be made incident on the quantum dot assemblies 93*a* and 93*b* and a wavelength of the corresponding light may be converted.

The light made incident on the quantum dot assemblies 93*a* and 93*b* may be converted into light having a variety of wavelengths such as red light, green light, blue light, and the like. Light having a variety of wavelengths such as light whose wavelength is converted by being made incident on the quantum dot assemblies 93*a* and 93*b*, light that does not pass through the quantum dot assemblies 93*a* and 93*b*, and the like may be mixed to form white light, and then made incident on the light guide plate 50'.

The quantum dot assemblies 93*a* and 93*b* may include a first quantum dot assembly 93*a* and a second quantum dot assembly 93*b*. The first quantum dot assembly 93*a* and the second quantum dot assembly 93*b* may be provided within a space formed by a side surface of the light guide plate 50' in which the light source 64 is positioned and a middle mold 40. A space in which the light source 64 is positioned may be formed by one surface of the light guide plate 50', a second support portion 40*b* of the middle mold 40 on which a plurality of optical sheets are seated, and a third support portion 40*c* that is a side surface of the middle mold 40.

As an example, the first quantum dot assembly 93*a* may be extended to a front side of the emission surface 50*b*' of the light guide plate 50' to be mounted on an inner surface of the second support portion 40*b* on which the plurality of optical sheets 30 are seated.

The second quantum dot assembly 93*b* may be provided to face the first quantum dot assembly 93*a*. As an example, the second quantum dot assembly 93*b* may be seated on the bottom surface 72 of the bottom chassis 70. In this instance, the second quantum dot assembly 93*b* may be provided to protrude to a front side of the reflection sheet 55, and thereby one surface of the second quantum dot assembly 93*b* may be exposed within the space in which the light source 64 is positioned.

FIG. 6 is a schematic view showing a quantum dot assembly provided in a display apparatus according to another embodiment of the present invention.

Referring to FIG. 6, the quantum dot assemblies 93*a* and 93*b* provided in the display apparatus 1A according to another embodiment of the present invention may include a quantum dot unit layer A and a reflection layer B. The quantum dot assemblies 93*a* and 93*b* may further include a heat sink C.

The quantum dot unit layer A, the reflection layer B, and the heat sink C may be sequentially laminated. The quantum dot assemblies 93*a* and 93*b* may be positioned in such a manner that the quantum dot unit layer A faces the light source 64.

For example, in a case of the first quantum dot assembly 93*a*, the quantum dot unit layer A may be positioned on a rear side in which the light source 64 is positioned, and the reflection layer B may be positioned on a front side of the quantum dot unit layer A. The reflection layer B may be obtained in such a manner that a material capable of reflecting light is coated on the front side of the quantum dot unit layer A or a reflection tape or the like is attached to the front side of the quantum dot unit layer A. The structure of the reflection layer B is not limited to the above description.

A part of light emitted from the backlight unit 63 may be made incident on the quantum dot unit layer A and a wavelength of the part of the light may be converted. Next, the light whose wavelength is converted may be reflected on the reflection layer B to be made incident on the incident surface 50*a*' of the light guide plate 50'.

The heat sink C may be provided on the front side of the reflection layer B, thereby radiating heat of the quantum dot unit layer A and the reflection layer B. The quantum dot unit layer A and the light source 64 that generates a lot of heat may be disposed in the same space, and therefore heat of a high-temperature may be supplied from the light source 64 to the quantum dot unit layer A. The heat supplied to the quantum dot unit layer A may be radiated by the heat sink C, thereby preventing the quantum dot unit layer A from being deteriorated.

Even in a case of the second quantum dot assembly 93*b*, the quantum dot unit layer A may be positioned on a side of the light source 64, the reflection layer B may be provided on a rear side of the quantum dot unit layer A, and the heat sink C may be provided on a rear side of the reflection layer B in a similar manner to that of the case of the first quantum dot assembly 93*a*. A wavelength of light made incident on the quantum dot unit layer A may be converted, and the light whose wavelength is converted may be reflected on the reflection layer B and then made incident on the incident surface 50*a*' of the light guide plate 50'. A temperature of the side of the quantum dot unit layer A and the reflection layer B may be reduced by the heat sink C provided on the rear side of the reflection layer B. Thus, it is possible to prevent the quantum dot unit layer A from being deteriorated by heat generated from the light source 64.

In this manner, in the case of the display apparatus 1A according to another embodiment of the present invention, the quantum dot unit layer A may be positioned to be spaced apart from the light source 64, thereby preventing the heat generated from the light source 64 from being directly transmitted to the quantum dot unit layer A. In addition, the heat transmitted to the quantum dot unit layer A may be radiated by the heat sink C, and therefore it is possible to effectively prevent the quantum dot unit layer A from being deteriorated by heat of a high-temperature.

FIG. 7 is a cross-sectional view showing a part of a display apparatus according to still another embodiment of the present invention.

Referring to FIG. 7, in a display apparatus 1B according to still another embodiment of the present invention, other components excluding a backlight unit 67 and a quantum dot assembly 94 may be applied in a similar manner to that in the display apparatus 1A according to another embodiment of the present invention. Hereinafter, the backlight unit 67 and the quantum dot assembly 94 will be described.

The backlight unit 67 may include a light source 68 and a printed circuit board 69. The light source 68 may be received within a case with an opening formed thereon, and the opening through which the light source 68 is exposed may be positioned toward a front side. A plurality of light sources 68 may be provided on a side of the light guide plate 50'.

A part of light emitted from the light source 68 may be directly made incident on the light guide plate 50', and the remaining part of the light may be made incident on the quantum dot assembly 94 so that a wavelength of the light may be converted.

The quantum dot assembly 94 may be positioned within a space formed by a side surface of the light guide plate 50' and the middle mold 40. The middle mold 40 may include a second support portion 40*b* that is extended to a front side of the light guide plate 50' so that a plurality of optical sheets 30 are seated on the second support portion 40*b* and a third support portion 40*c* that forms a side surface. The light source 68 may be positioned within a space formed by one surface of the light guide plate 50', the second support portion 40*b*, and the third support portion 40*c*.

The quantum dot assembly 94 may be provided so as to have a similar structure to the structure of the quantum dot assembly shown in FIG. 6. Specifically, the quantum dot assembly 94 may include a quantum dot unit layer A, a reflection layer B, and a heat sink C. The quantum dot unit layer A may be disposed toward a rear side on which the light source 68 is positioned. The reflection layer B may be positioned on a front side of the quantum dot unit layer A, and the heat sink C may be provided on a front side of the reflection layer B.

The quantum dot assembly 94 may be positioned so as to form a predetermined angle in a direction in which the light guide plate 50' is extended, so that light emitted from the light source 68 is reflected by the quantum dot assembly 64(94) and made incident on a side surface of the light guide plate 50'. In this instance, one surface of the quantum dot unit layer A may be positioned to face the incident surface 50*a'* of the light guide plate 50' while an angle θ between the incident surfaces 50*a'* is an acute angle.

The quantum dot assembly 94 may be positioned to form a predetermined angle with an inner surface of the middle mold 40. As an example, one side of the quantum dot assembly 94 may be mounted on a side of the second support portion 40*b*, and the other side thereof may be mounted on a side of the third support portion 40*c*. An angle formed between the quantum dot assembly 94 and the inner surface of the middle mold 40 may be appropriately adjusted in such a manner that light emitted from the light source 68 can be reflected by the quantum dot assembly 94 to be made incident on the incident surface 50*a'* of the light guide plate 50'.

A part of the light emitted from the light source 68 may be made incident on the quantum dot assembly 94. A wavelength of the light made incident on the quantum dot assembly 94 may be converted while the light made incident on the quantum dot assembly 94 passes through the quantum dot unit layer A, and the light whose wavelength is converted may be reflected by the reflection layer B to be made incident on the incident surface 50*a'* that is one surface of the light guide plate 50'. The light made incident on the light guide plate 50' may be emitted through an emission surface 50*b'* to be supplied to the display panel 20.

Heat that is generated from the light source 68 and then transmitted to the quantum dot unit layer A may be radiated by the heat sink C. The quantum dot unit layer A may be positioned to be spaced apart from the light source 68, and therefore the heat generated from the light source 68 may not be directly supplied to the quantum dot unit layer A. In addition, heat radiation may be performed by the heat sink C, and therefore it is possible to effectively prevent the quantum dot unit layer A from being deteriorated by the heat generated from the light source 68.

In FIGS. 5 and 7, an example in which the quantum dot assembly 94 is mounted on the inner surface of the middle mold 40 has been described, but the position in which the quantum dot assembly 94 is mounted is not limited to the above description.

The quantum dot unit and the quantum dot assembly may be respectively referred to as a wavelength conversion unit or a wavelength conversion assembly. In addition, even on one side of the sub light guide plate to which the quantum dot unit provided in the display apparatus 1 according to an embodiment of the present invention is connected, components such as the reflection layer, the heat sink, and the like may be further provided.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A display apparatus comprising:

a display panel configured to display an image;

a light source;

a light guide plate that is positioned on a rear side of the display panel and guides light emitted from the light source; and a quantum dot unit spaced apart from the light source and configured to convert a wavelength of at least a part of the light emitted from the light source, wherein the quantum dot unit comprises a light reflection layer for reflecting light having a converted wavelength, wherein a surface of the light reflection layer forms an acute angle with respect to a light-incident surface of the light guide plate, and further comprising another quantum dot unit, wherein the quantum dot unit and the other quantum dot unit are arranged to face each other in a front and back direction between the light source and the light guide plate.

2. The display apparatus of claim 1, wherein the quantum dot unit further comprises a heat sink.

3. The display apparatus of claim 2, wherein the heat sink is provided on one surface of the light reflection layer.

4. The display apparatus of claim 1, wherein the light source is a single light source.

5. The display apparatus of claim 4, wherein the light source is a laser light source.

6. The display apparatus of claim 1, wherein the quantum dot unit and the light guide plate are arranged so that light passing through the quantum dot unit and is then incident on the light guide plate is mixed with light incident on the light guide plate from the light source to form white light.

7. The display apparatus of claim 1, wherein the light source is configured to emit blue light.

8. The display apparatus of claim 1, further comprising a middle mold provided between the display panel and the light source, wherein the quantum dot unit is mounted on an inner wall of the middle mold.

9. A display apparatus comprising:

a display panel configured to display an image;

a light source;

a quantum dot assembly configured to convert a wavelength of at least part of light emitted from the light source; and a light guide plate that guides light emitted from the light source and light passing through the quantum dot assembly, wherein the quantum dot assembly includes at least one quantum dot unit configured to convert a wavelength of light incident thereon, a light reflection layer provided on one surface of the quantum dot unit and configured to reflect light having a converted wavelength, a heat sink provided on one surface of the reflection layer, wherein a surface of the light reflection layer forms an acute angle with respect to a light-incident surface of the light guide plate, and further comprising another quantum dot unit, wherein the quantum dot unit and the other quantum dot unit are arranged to face each other in a front and back direction between the light source and the light guide plate.

10. The display apparatus of claim 9, wherein the quantum dot assembly is positioned between one surface of the light guide plate and the light source.

* * * * *